(12) United States Patent
Barajas

(10) Patent No.: US 7,999,664 B2
(45) Date of Patent: Aug. 16, 2011

(54) BEHAVIOR-BASED LOW FUEL WARNING SYSTEM

(75) Inventor: Leandro G. Barajas, Troy, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 328 days.

(21) Appl. No.: 12/333,422

(22) Filed: Dec. 12, 2008

(65) Prior Publication Data

US 2010/0148952 A1 Jun. 17, 2010

(51) Int. Cl.
*B60Q 1/00* (2006.01)
(52) U.S. Cl. ............. 340/450.2; 340/438; 701/123; 73/114.53; 73/114.54
(58) Field of Classification Search ............ 340/450.2, 340/425.5, 438, 457, 457.4, 458, 459, 460, 340/461, 474, 500; 701/123, 1; 73/114.53, 73/114.54
See application file for complete search history.

(56) References Cited

U.S. PATENT DOCUMENTS

| | | | |
|---|---|---|---|
| 4,157,030 A * | 6/1979 | Keely | 73/114.53 |
| 4,167,002 A | 9/1979 | Foley | |
| 4,217,644 A | 8/1980 | Kato et al. | |
| 4,513,277 A | 4/1985 | Moore et al. | |
| 4,627,283 A | 12/1986 | Nishida et al. | |
| 5,105,663 A | 4/1992 | Kuhlen | |
| 5,177,685 A | 1/1993 | Davis et al. | |
| 5,765,435 A | 6/1998 | Grotschel et al. | |
| 5,790,973 A | 8/1998 | Blaker et al. | |
| 5,913,917 A * | 6/1999 | Murphy | 701/123 |
| 6,138,524 A | 10/2000 | Tsuda et al. | |
| 6,356,836 B1 | 3/2002 | Adolph | |
| 6,484,088 B1 | 11/2002 | Reimer | |
| 6,591,185 B1 | 7/2003 | Polidi et al. | |
| 6,594,579 B1 | 7/2003 | Lowrey et al. | |
| 6,940,401 B2 * | 9/2005 | Taxon | 340/450.2 |
| 7,066,216 B2 | 6/2006 | Sato et al. | |
| 7,155,367 B1 | 12/2006 | Shapiro et al. | |
| 7,233,861 B2 | 6/2007 | Van Buer et al. | |
| 7,239,962 B2 | 7/2007 | Plutowski | |
| 2003/0060977 A1 | 3/2003 | JiJina et al. | |
| 2003/0230443 A1 | 12/2003 | Cramer et al. | |
| 2006/0052934 A1 | 3/2006 | Tomita et al. | |
| 2006/0293839 A1 | 12/2006 | Stankieiwcz et al. | |
| 2007/0294030 A1 | 12/2007 | Jones | |
| 2008/0004802 A1 | 1/2008 | Horvitz | |
| 2008/0027639 A1 | 1/2008 | Tryon | |

* cited by examiner

*Primary Examiner* — Toan N Pham

(57) ABSTRACT

A method is provided for determining when to provide a refueling notification to a driver of a vehicle. A refueling behavior is determined for refueling the vehicle. The refueling behavior is associated at least in part to an amount of fuel customarily remaining in the vehicle when the vehicle is customarily refueled. A remaining amount of fuel in the vehicle and a fuel economy of the vehicle are determined. A distance the vehicle will travel to a next driving destination is estimated. An amount of fuel that will be used to travel to the next driving destination is estimated based on the estimated distance the vehicle will travel to the next driving destination and the fuel economy. A determination is made whether the amount of fuel that will be remaining in the vehicle after the vehicle travels to the next driving destination is less than the amount of a fuel customarily remaining in the vehicle when the vehicle is refueled. A refueling notification is actuated to a driver of a vehicle in response to the determination that the amount of fuel that will be remaining in the vehicle after the vehicle travels to the next driving destination will be less than the amount of fuel customarily remaining in the vehicle when the vehicle is refueled.

22 Claims, 4 Drawing Sheets

US 7,999,664 B2

BEHAVIOR-BASED LOW FUEL WARNING SYSTEM

BACKGROUND OF INVENTION

An embodiment relates generally to vehicle refueling warning system.

Vehicle low fuel warning systems are typically monitored by an analog gauge which measures the remaining fuel within the gas tank and then provides a warning to the vehicle driver of a "low fuel" warning. The warning may be triggered by either by a predetermined level of fuel in the fuel tank or may be triggered by a controller determining the estimated miles remaining based on fleet miles per gallon averages or on recent driving conditions. In response to either method, the warning is provided to the driver in which the driver must refuel the vehicle prior to the vehicle traveling beyond the driving range or prior to using the remaining amount of fuel in the vehicle.

A driver typically refuels their vehicle at one or more known and convenient fueling stations which the driver is comfortable with the location and knows approximately the price of gas at that fueling station. More specifically, the refueling station is typically en-route on one of the driver's customary commuting paths. However, waiting until the low fuel warning provided by a conventional vehicle may not afford the vehicle driver the choice of refueling the vehicle at one of their customary fueling stations. Various smart gas gauges have been known to alert drivers when their vehicle is within a vicinity of the refueling station; however, many of these systems use navigation data provided by a GPS system or the like. This additional equipment requires additional and complex hardware at an added cost.

SUMMARY OF INVENTION

An advantage of an embodiment of the invention is the notification to a driver of a vehicle that the fuel remaining in the fuel reservoir of the vehicle is or is a approaching a level that the vehicle is typically refueled based on the refueling behaviors of the vehicle. Moreover, the system estimates the next driving destination that the vehicle is likely to be commuting to and estimates whether the remaining fuel in the reservoir will be below the fuel level that the vehicle is typically refueled upon arrival at the next driving destination and issues the alert notification in response to estimating the fluid level dropping below that level of the reservoir. The refueling notification system utilizes minimal computing resources and existing hardware therefore keeping cost to a minimum.

An embodiment contemplates a method for determining when to provide a refueling notification to a driver of a vehicle. A refueling behavior is determined for refueling the vehicle. The refueling behavior is associated at least in part to an amount of fuel customarily remaining in the vehicle when the vehicle is customarily refueled. A remaining amount of fuel in the vehicle and a fuel economy of the vehicle are determined. A distance the vehicle will travel to a next driving destination is estimated. An amount of fuel that will be used to travel to the next driving destination is estimated based on the estimated distance the vehicle will travel to the next driving destination and the fuel economy. A determination is made whether the amount of fuel that will be remaining in the vehicle after the vehicle travels to the next driving destination is less than the amount of a fuel customarily remaining in the vehicle when the vehicle is refueled. A refueling notification is actuated to a driver of a vehicle in response to the determination that the amount of fuel that will be remaining in the vehicle after the vehicle travels to the next driving destination will be less than the amount of fuel customarily remaining in the vehicle when the vehicle is refueled.

An embodiment contemplates a refueling notification system. A processor determines a refueling behavior for refueling the vehicle. The refueling behavior being associated at least in part with an amount of a fuel customarily remaining in the vehicle when the vehicle is refueled. The processor is configured for receiving input signals indicating a remaining amount of fuel in the vehicle. A refueling notification is provided for notifying a driver of the vehicle of a refueling behavior condition. The refueling notification indicating that the level of fuel within the vehicle upon reaching a next expected destination will be less than the level of fuel remaining when the vehicle is customarily refueled. A fuel economy of the vehicle is determined. The processor estimates a distance the vehicle will travel to a next driving destination. The processor calculates an amount of fuel that will be used to travel to the next driving destination based on the estimated distance the vehicle will travel to the next driving destination and the fuel economy. The processor determines whether the amount of fuel that will be remaining in the vehicle after the vehicle travels to the next driving destination is less than the amount of a fuel customarily remaining in the vehicle when the vehicle is refueled. The refueling notification is actuated to a driver of a vehicle in response to the determination that the amount of fuel that will be remaining in the vehicle after the vehicle travels to the next driving destination will be less than the amount of fuel customarily remaining in the vehicle when the vehicle is refueled.

DETAILED DESCRIPTION

Figure 1:
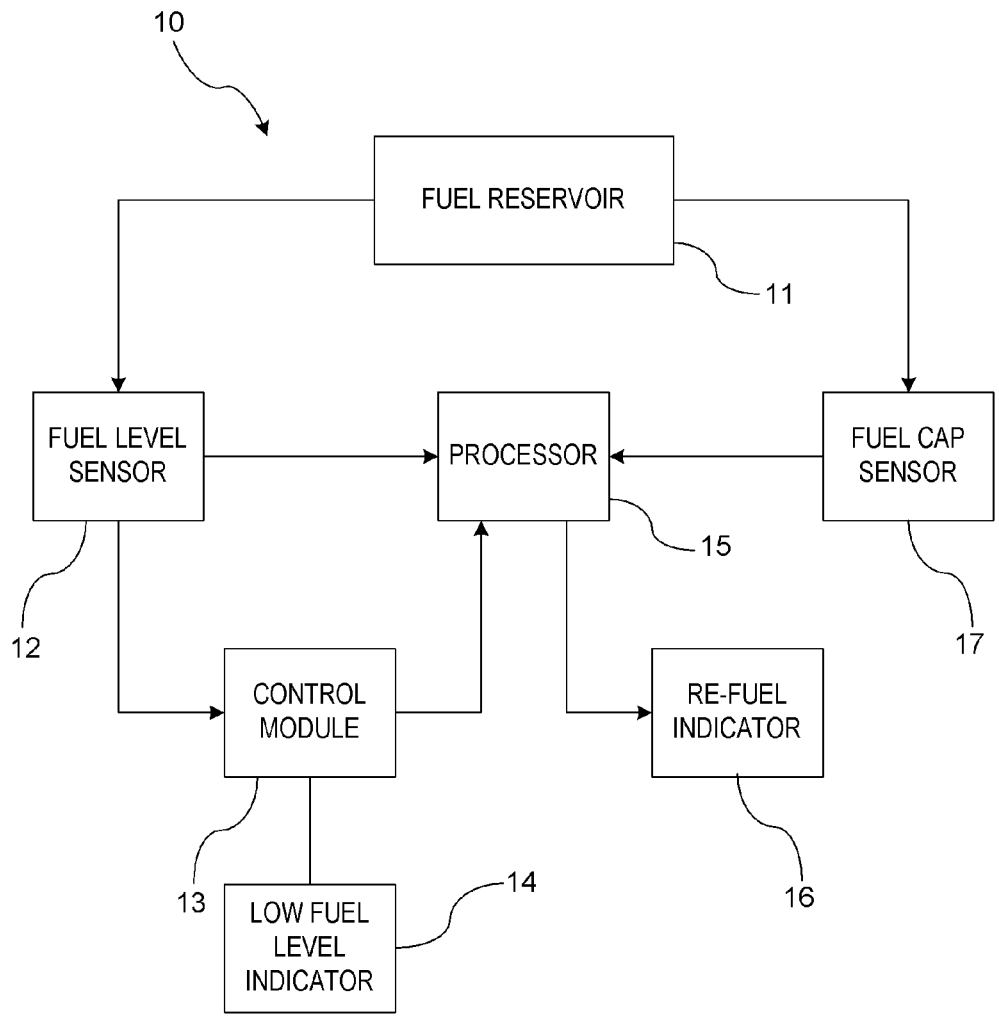
FIG. 1 is a block diagram of the refueling notification system.

There is shown illustrated in FIG. 1 a vehicle fuel monitoring system 10 for a vehicle. The vehicle includes a fuel storage reservoir 11. The level of the fuel within the reservoir 11 is monitored by a fuel sensor 12.

The fuel level obtained from the fuel sensor 12 is provided to a control module 13. The control module 13 may include a powertrain control module, engine control module, or like control module. The control module 13 determines a remaining amount of fuel or a driving range such as the distance remaining to empty. Typically, the vehicle includes a low level fluid warning indicator 14 which provides a warning as to the low level of fuel remaining in the reservoir 11. The low level warning indicator 14 may be displayed as an icon that indicates that the fuel level of the reservoir 11 is below a predetermined limit which signifies that only a predetermined amount of fuel remains. The low level warning indicator 14 may also be provided as an analog or digital display which provides an estimated distance until empty warning.

FIG. 1 also illustrates a processor 15 that is used to determine and provide a refueling notification to a driver based on refueling behavior. The refueling notification does not replace the low level fuel warning; rather the refueling notification serves to enhance the driver's awareness by notifying the driver that the level of the fuel or driving range is at a point which the vehicle typically refuels based on past refueling behaviors. The refueling notification routine can be implemented without requiring the use of extra hardware since data can be obtained via existing hardware. The software requires low level computing, and therefore, does not require a high end processor. As a result, any existing microprocessor within the vehicle may be utilized such as the microprocessor of the control module 13.

The processor 15 processes the data for determining the refueling behavior of the vehicle based on the distance the vehicle travels between refuelings. As a result, the system can provide the refueling notification without the use of wireless data extrinsic of the vehicle. Alternatively, extrinsic information can be used if the vehicle has such equipment readily available to obtain such data but is not required or necessary for determining when the notification warning may be issued. A refueling indicator 16 is provided for alerting the driver of the vehicle of the refueling notification. The refueling indicator 16 can be a visual, audible, or haptic notification.

The processor 15 estimates an amount of fuel that will be used to travel to a next driving destination. The determination is based on an estimated distance that the vehicle will travel to the next driving destination and the fuel economy of the vehicle which may be determined from a data-driven usage model. The estimated distance that the vehicle will travel to a next destination may be determined by predicting commuting paths. In a preferred embodiment, the commuting paths are estimated by periodically determining that the vehicle is at a resting location. A respective resting location is determined in response to the relative and absolute time that the vehicle is parked at the respective resting location. In identifying each respective location by the time the vehicle is parked at each location, commuting patterns may be established between respective resting locations. For example, a vehicle rests at a home location for a first period of time. The vehicle commutes a distance to a next destination such as work where the vehicle is parked for a second period of time. Thereafter, the vehicle routinely travels a respective distance to a next location after work, such as a fitness facility, and is parked for a third period of time. The vehicle thereafter routinely travels a respective distance to the home location. In monitoring the time spent at a resting location, the system can predict the next destination and the distance to be traveled to the next destination based on learned commuting paths.

Figure 2:
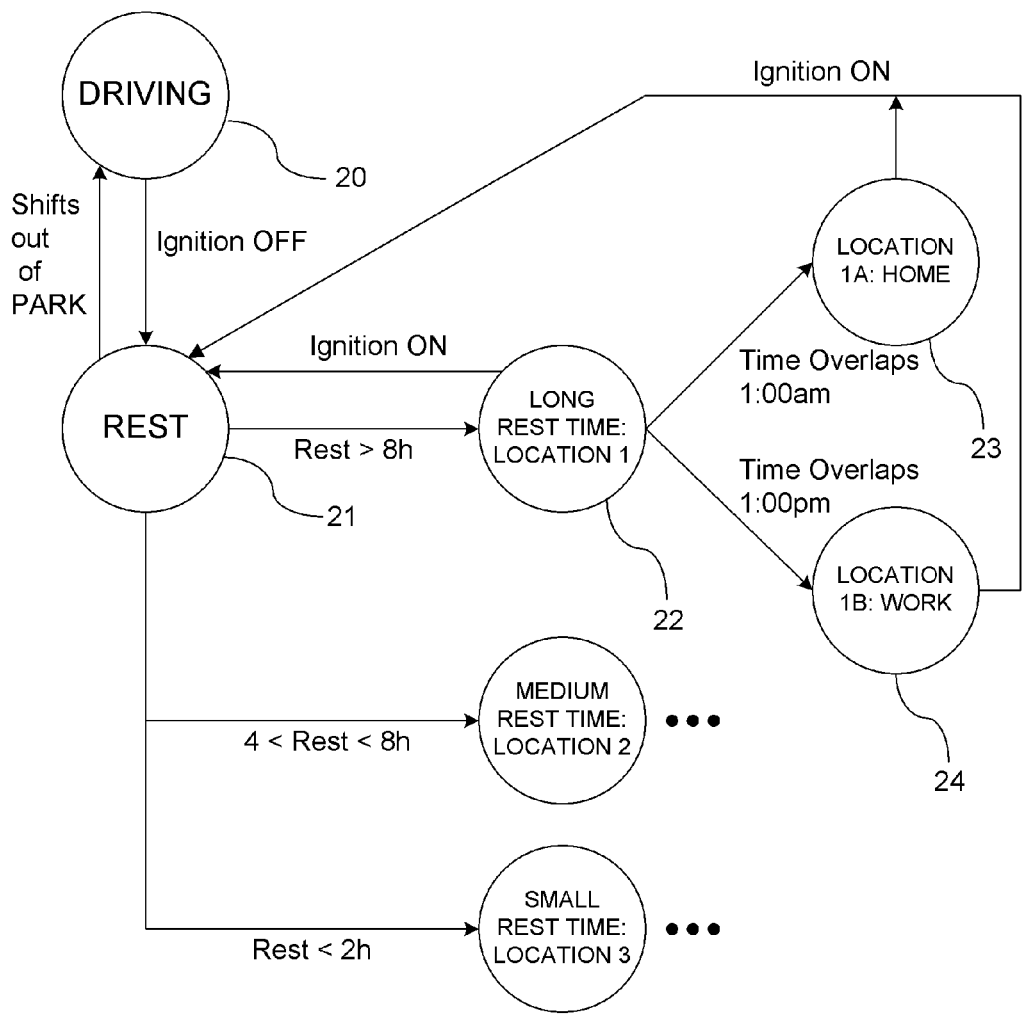
FIG. 2 is a block diagram for identifying the resting locations.

FIG. 2 illustrates a flow diagram for determining the resting locations. In block 20, the vehicle is driven to a respective destination. In block 21 the destination is detected when the ignition is turned to the off position. While the vehicle is at rest, the relative time the vehicle is at rest is monitored which used to further determine the resting location based on the resting time. For example, if the length of time is greater than 8 hours, then the routine proceeds to block 22 to further define the location. During the time the vehicle is at rest, the absolute time is monitored using a respective clock within the vehicle. This is performed in the event that a vehicle parks in more than one location during the day for substantially a same amount/range of time. If data indicates that the vehicle rests a same amount/range of time during more than one period during a 24 hour period, then an absolute time is used to distinguish the resting location. For example, in block 23, a first location (e.g., home location) is identified in response to the relative time that the vehicle spends at the first location overlaps with a respective first absolute time (e.g., 1:00 AM). In block 24, a second location (e.g., work location) is identified in response to the relative time that the vehicle spends at the second location overlapping with a respective second absolute time (e.g., 1:00 pm). In block 24 (or block 23), the ignition is turned on and the relative time monitoring is disabled in block 21 as the routine returns to block 20 as the vehicle is shifted out of the park position. The routine awaits an ignition off operation to enable the relative time monitoring. It should be understood that the resting time ranges and absolute times shown in FIG. 2 are for exemplary purposes only and resting time ranges and comparative absolutes time may be other than that shown.

The fuel economy may be determined by a plurality of methods such as a prediction estimator. In a preferred embodiment, the prediction estimator estimates the fuel economy based on the average miles per gallon driven between vehicle refuelings. Alternatively, the prediction estimator may estimate the fuel economy based on an instantaneous fuel economy of the vehicle. The prediction estimator may also determine the fuel economy based on an average miles per gallon since a last engine start-up operation. Moreover, if the vehicle is new and historical data has not been established, then the prediction estimator may determine the fuel economy based on a predetermined average, such as a national or local average, or an established miles per gallon average set by the manufacturer (e.g., fleet vehicles)

Figure 3:
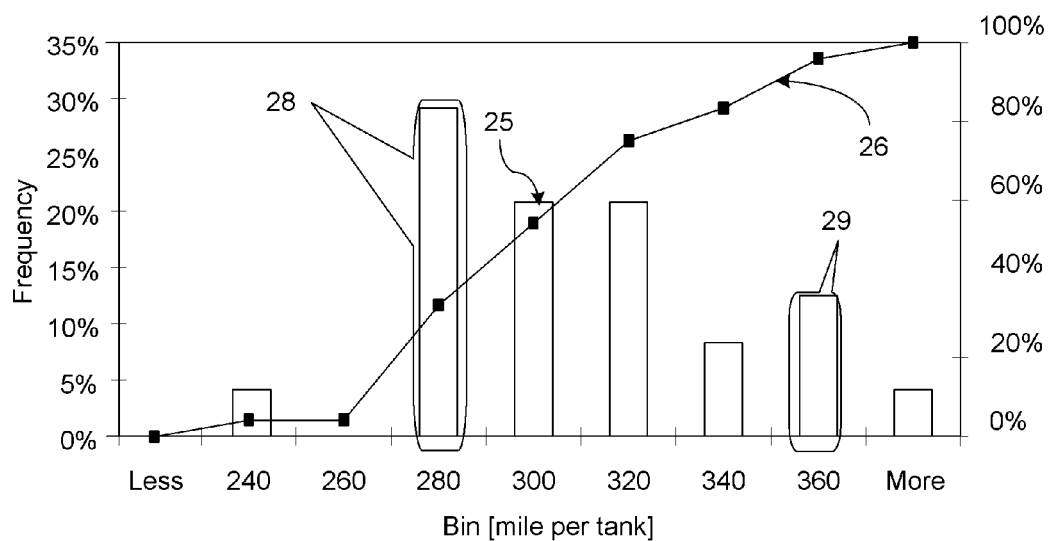
FIG. 3 is a graph of miles driven per tank histogram.
Figure 4:
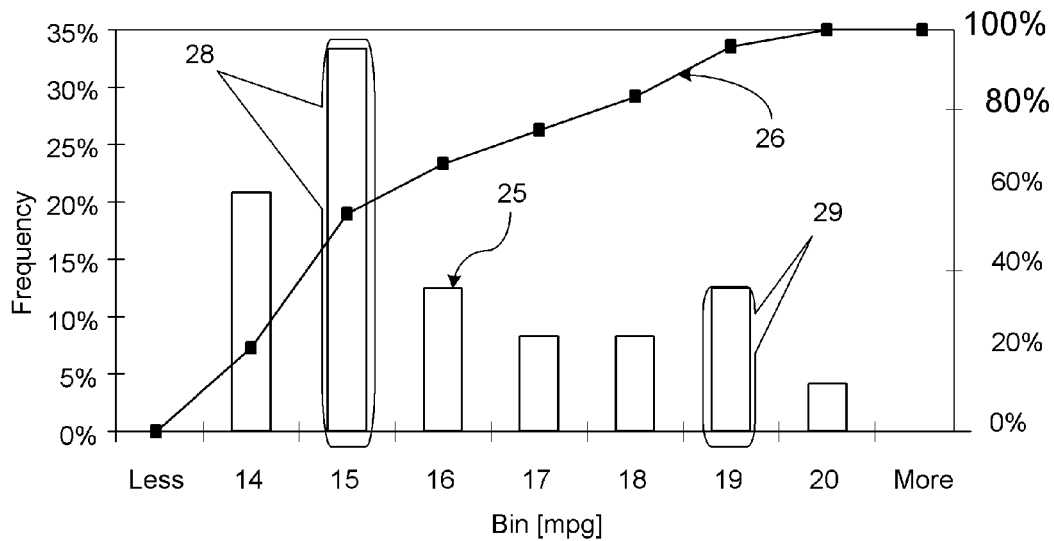
FIG. 4 is a graph of a fuel economy histogram.

The methods described above may be further refined by determining the mode of the driving usage (i.e., unimodal or multi-modal). Unimodal data does not differentiate whether the data retrieved applies to urban (i.e., city) driving as opposed to highway driving. As a result, the data may be derived by a simple statistical model (i.e., mean, mode, average) which requires no discrimination or segregation of the data. In using a mode other than unimodal such as a bi-modal model, data may be derived for both highway driving and urban driving. A histogram, as shown in FIGS. 3 and 4, is generated based on the collected data using a probability density function 25 or the corresponding cumulative density function 26. The cumulative density function 26 may be based on an empirical or an analytical cumulative density function. The data of the histogram may be based on the driving range or fuel economy. For a bi-modal model distribution, shown in FIGS. 3 and 4, a first driving mode (i.e., urban driving) is shown generally at 28 and a second driving mode (i.e., highway driving) is shown generally at 29.

Figure 5:
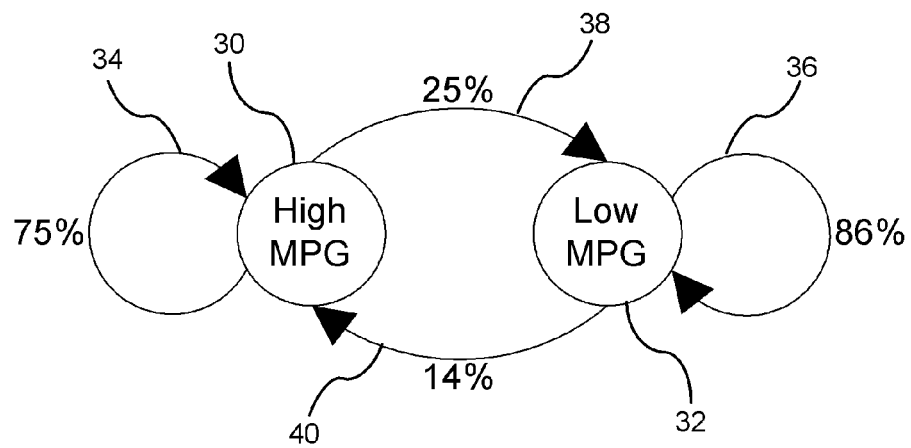
FIG. 5 is a state diagram for a bi-modal driving model.

Selecting the driving mode under a bi-modal distribution may be based on one of a plurality of predictive estimators, but not limited to, a first order Markov Model as illustrated in FIG. 5. The Markov Model is illustrated as a state flow diagram. A plurality of transition legs are shown for transitioning between the two states. The two states are illustrated as a highway fuel economy state 30 (e.g., high mpg) and an urban fuel economy state 32 (e.g., low mpg). A first transition leg 34 illustrates a likelihood of staying within the highway state 30 without transitioning to the urban state 32. A second transition leg 36 illustrates the likelihood of staying within the urban state 32 without transitioning to the highway state 30. A third transition leg 38 transitions from the highway state 30 to the urban state 32. A fourth transition leg 38 transitions from the urban state 32 to the highway state 30. The likelihood of each transition leg occurring is designated by the respective percentages as shown. These percentages are exemplary and will be adjusted once enough data from the current user is available. For example, if the vehicle is currently traveling in the highway state 36, then the likelihood of staying within the highway state 36 is 75%. The likelihood of transitioning from the highway state 36 to the urban state 32 is 25%. Conversely, the likelihood of staying within the urban state 32 is 86%, whereas the likelihood of transitioning between the urban state 32 and the highway state 30 is 16%. Based on the current state that the vehicle is traveling in, a decision may be made as to which mode to select (e.g., urban state and highway state). Alternatively, each of the states may be weighted and applied in a formula for determining a fuel economy that is a function of both the weighted urban state and the weighted highway state fuel economy.

Based on the fuel economy selected, an estimation is made at a respective rest location of what is the fuel usage for traveling to a next predicted destination. The expected fuel usage is determined based on the expected distance of travel from the current destination to the next expected driving destination and the estimated fuel economy. The estimated remaining fuel (or driving range) that will be available after the vehicle reaches the next destination is compared to the fuel level (or remaining driving range) that is typically remaining in the reservoir when the vehicle is refueled. It should be understood that that the term "remaining fuel" as used herein is interchangeable with the term "driving range" which is based on the current fuel level, and may be used to determine when to actuate the refueling notification as opposed to utilizing only the level of fuel. If the estimated fuel level remaining after the vehicle reaches a next driving destination is less than the fuel level when the vehicle refuels, then the refueling notification is actuated for alerting the driver of the condition. The refueling notification is provided prior to the low level warning which is typically displayed to the driver as a final warning. The refueling notification is actuated to provide notice to the driver that fuel level will drop below a respective level at which the vehicle is typically refueled if the vehicle travels to the next expected driving destination without refueling. In comparison to a low level fuel warning that is actuated when the vehicle fuel level is typically at 2 gallons of fuel remaining or 40 miles driving range, a refueling notification may be provided at ⅛ full, ¼, full, ½ full, or the corresponding driving range. This notification is entirely dependent upon the refueling behaviors of the persons driving the vehicle. Remaining fuel levels in the reservoir at the time (or driving range) of the respective refueling events are compiled at the time when the fuel retention cap (e.g., gas cap) or similar device to the reservoir is removed. Vehicles are commonly equipped with a fuel cap sensor 17 (shown in FIG. 1) such as a gas cap sensor for emission purposes which detects when the fuel retention cap is in an unsecured position (i.e., not sealed). The detection of the fuel retention cap being in an unsecured position implies that the vehicle is being refueled.

Figure 6:
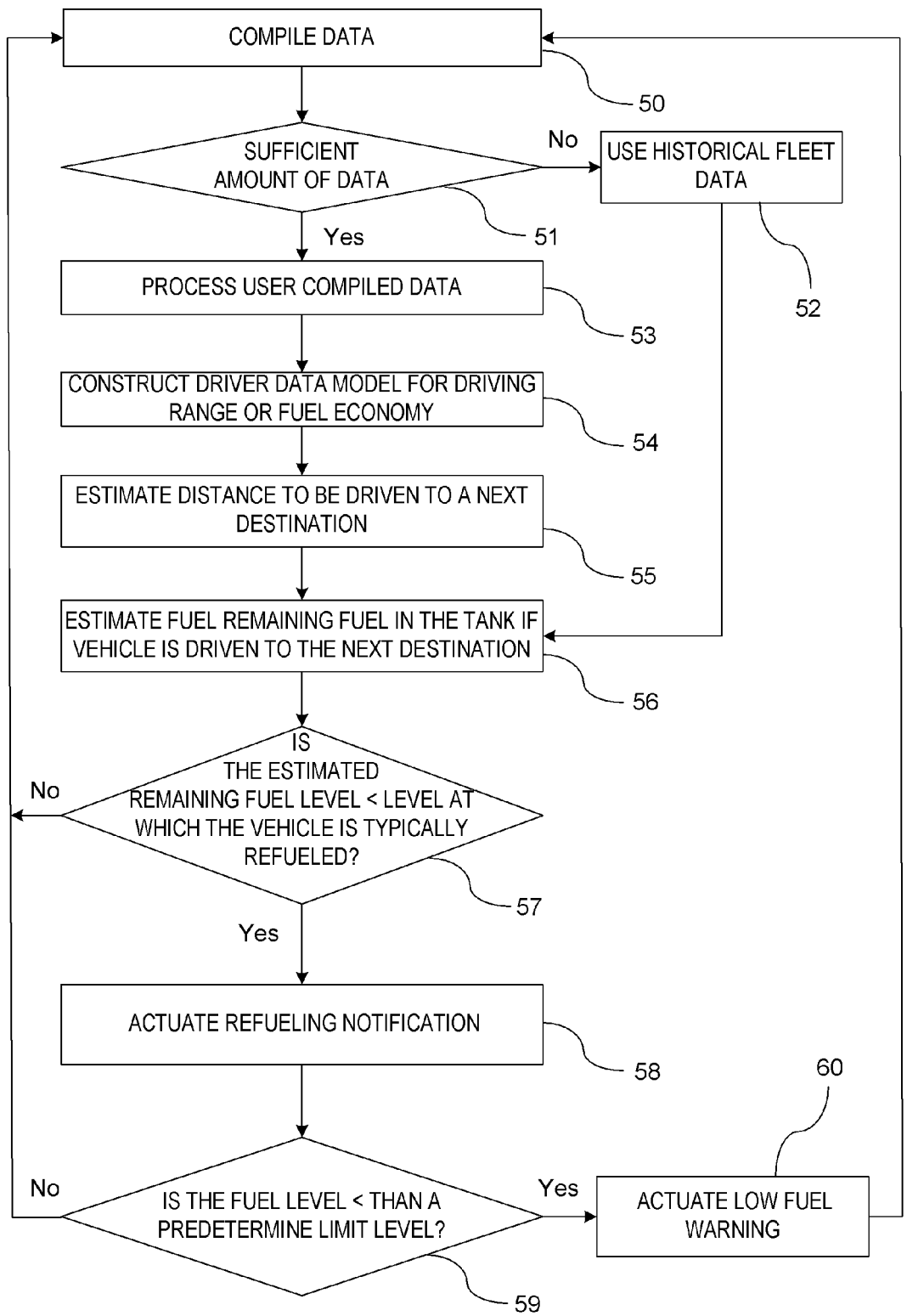
FIG. 6 is a flowchart of a method for a re-fueling notification routine.

FIG. 6 illustrates a flowchart for a method showing the refueling notification routine. In step 50, user driven data is collected. The user collected data may include, but is not limited to, distance driven since a last refill (e.g., miles per tank), miles per gallon data, time at each resting location, and refueling events. Refueling events occur when the vehicle is refueled at a respective fluid level remaining in the reservoir.

In step 51, a determination is made whether enough driver usage data has been obtained for estimating the driving destinations, driving ranges, and estimated fuel economy. If an insufficient amount of data has been obtained, then the system defaults to using historical data such as national average data or vehicle fleet data in step 52. If a sufficient amount of data is obtained in step 51, the routine proceeds to step 53 where the compiled user data is processed. In step 53, compiled user data is used to identify resting locations based on the duration of time the vehicle is parked at each resting location which allows the system to predict commuting paths. Moreover, the distance traveled between commuting locations may also be compiled.

In step 54, a histogram is generated based on a probability density function or may be based on a cumulative density function. The histogram may illustrate the total number of miles traveled between refuelings and/or the average miles per gallon driven for the vehicle.

In step 54, the histogram may also identify the frequency of the different modes of driving (e.g., unimodal, bimodal, etc). If a bimodal distribution is present, data may be processed for establishing a state diagram as shown in FIG. 4 for predicting the driving mode to better enhance driving range estimation to the respective destination.

In step 55, an estimation is made regarding the amount of fuel that will be used to travel to the next driving destination. The estimation for the amount of fuel used is based on the estimation of the distance that the vehicle will travel to the next driving destination and the expected fuel economy for that respective commute. The estimated driving distance may be based on recorded distances determined between respective resting locations. A respective resting location is identified by the duration of time that the vehicle is parked at the respective resting location. A resting location can also be identified by an absolute time at which the vehicle was at rest, for example 1:00 a.m. As a result, a next driving destination may be determined based on behavior commuting paths between resting location. In addition, fuel economy for the expected commuting path may be estimated by the various methods described earlier using a unimodal prediction estimator or a multi-modal prediction estimator. In response to determining the expected traveled distance and the expected fuel economy along the predicted commuting path, an estimated amount of fuel that will be used to travel to the next destination is determined in step 56. If an insufficient amount of data was determined in step 51 to construct each of the models, then historic fleet data or national average data is used in step 56 to estimate the amount of fuel used for determining the remaining amount of fuel in the reservoir.

In step 57, a comparison is made between the estimated amount of fuel that will be left in the reservoir (or driving range) if the vehicle travels to the next driving destination and the fuel level (or fuel range) at which the vehicle typically refuels. If the estimated amount of fuel that will be left in the reservoir is less than the fuel level at which the vehicle typically refuels, then the routine proceeds to step 58 where a refueling notification is actuated. The refueling notification provides a warning that the amount of fuel remaining in the reservoir upon completion of the expected path of travel to the next driving destination will be less than the level of fuel remaining in the reservoir when the vehicle is typically refueled. Since the user is accustomed to filling the vehicle up when the fuel level reaches a respective level, the refueling notification provides an advanced warning that the remaining fuel in the reservoir upon completion of the commute to the next driving destination will be below the fuel level that the vehicle is accustomed to being refueled. If the determination in step 57 is that the estimated amount of fuel that will be left in the reservoir is greater than the fuel level which the vehicle typically refuels, then the routine returns to step 50 without providing a refueling notification.

In step 59, a determination is made whether the fuel level in the tank is less than a predetermined fuel level. The predetermined fuel level is typically a low fluid warning that is provided when the fuel level reaches a predetermined fuel level (e.g., 2 gallons until empty) or when a limited driving range limit remains (e.g., 40 miles of driving remaining until empty). If a determination is made that the fuel level is less than the predetermined fuel level, then a low fuel level warning is actuated in step 60. The routine thereafter returns to step 50. If the determination is made in step 59 that the fuel level is not less than the predetermined fuel level, then a return is made to step 50 without actuating the low fuel level warning.

While certain embodiments of the present invention have been described in detail, those familiar with the art to which this invention relates will recognize various alternative designs and embodiments for practicing the invention as defined by the following claims.

What is claimed is:

1. A method of determining when to provide a refueling notification to a driver of a vehicle, the method comprising the steps of:
   determining a refueling behavior for refueling the vehicle, the refueling behavior being associated at least in part with an amount of fuel customarily remaining in the vehicle when the vehicle is customarily refueled;
   determining a remaining amount of fuel in the vehicle;
   determining a fuel economy of the vehicle;
   estimating a distance the vehicle will travel to a next driving destination;
   estimating an amount of fuel that will be used to travel to the next driving destination based on the estimated distance the vehicle will travel to the next driving destination and the fuel economy;
   determining whether the amount of fuel that will be remaining in the vehicle after the vehicle travels to the next driving destination is less than the amount of a fuel customarily remaining in the vehicle when the vehicle is refueled; and
   actuating a refueling notification to a driver of a vehicle in response to the determination that the amount of fuel that will be remaining in the vehicle after the vehicle travels to the next driving destination will be less than the amount of fuel customarily remaining in the vehicle when the vehicle is refueled.

2. The method of claim 1 wherein the refueling behavior for refueling the vehicle is associated in part with a driving range, the driving range being the distance the vehicle travels until the vehicle is customarily refueled.

3. The method of claim 2 wherein a histogram is used to determine a driving mode of the vehicle.

4. The method of claim 3 wherein the driving mode is a highway driving mode that includes fuel economy mileage obtained during periods when the vehicle is driven during non-stopping driving conditions above a predetermined speed.

5. The method of claim 3 wherein the driving mode is an urban driving mode that includes fuel economy mileage obtained during periods when the vehicle is driven during stop and go driving conditions.

6. The method of claim 3 wherein the histogram is represented in miles per gallon data.

7. The method of claim 3 wherein the histogram is represented in total miles per tank data.

8. The method of claim 3 wherein the histogram is generated based on a probability density function.

9. The method of claim 3 wherein the histogram is generated based on a cumulative density function.

10. The method of claim 3 wherein a determination is made whether the histogram is unimodal, wherein an optimized unimodal prediction estimator is used if the determination is made that the histogram is unimodal, and wherein a multimodal prediction estimator is used if the determination is made that the histogram is not unimodal.

11. The method of claim 1 wherein a prediction estimator predicts the fuel economy.

12. The method of claim 11 wherein the prediction estimator predicts the fuel economy based on the average miles driven per gallon since a last engine start-up operation.

13. The method of claim 11 wherein the prediction estimator predicts the fuel economy based on the average miles per gallon driven between vehicle refuelings.

14. The method of claim 11 wherein the prediction estimator predicts the fuel economy based an instantaneous fuel economy.

15. The method of claim 11 wherein the prediction estimator predicts the fuel economy based on a predetermined value.

16. The method of claim 1 wherein an estimated distance that the vehicle will travel to a next driving destination is determined in response to commuting behaviors.

17. The method of claim 11 wherein the commuting behaviors of the driven vehicle are determined as function of the time the vehicle rests at a resting location.

18. The method of claim 17 wherein the step of estimating a distance the vehicle will travel to a next driving destination comprises the steps of:
   compiling the resting times of the vehicle at each resting location;
   detecting repeated commute paths according to the resting locations; and
   determining a next destination location based on the current resting location and detected commute paths.

19. The method of claim 18 further comprising the steps of:
   matching refueling events to respective commute paths; and
   estimating whether a refueling location is en-route during travel to a next expected resting location based on the estimated commute path.

20. The method of claim 19 wherein the refueling notification is actuated in response to the refueling event being en-route in the commuting path of travel and the determination that the amount of fuel that will be remaining in the vehicle after the vehicle travels to the next driving destination will be less than the amount of fuel customarily remaining in the vehicle when the vehicle is refueled.

21. The method of claim 1 wherein the refueling notification to the driver is actuated prior to a vehicle low fuel warning.

22. A refueling notification system for a vehicle comprising:
   a processor for determining a refueling behavior for refueling the vehicle, the fueling behavior being associated at least in part with an amount of a fuel customarily remaining in the vehicle when the vehicle is refueled, the processor configured for receiving input signals indicating a remaining amount of fuel in the vehicle; and
   a refueling notification for notifying a driver of the vehicle of a refueling behavior condition, the refueling notification indicating that the level of fuel within the vehicle upon reaching a next expected destination will be less than the level of fuel remaining when the vehicle is customarily refueled;
   wherein a fuel economy of the vehicle is determined, wherein the processor estimates a distance the vehicle will travel to a next driving destination, wherein the processor calculates an amount of fuel that will be used to travel to the next driving destination based on the estimated distance the vehicle will travel to the next driving destination and the fuel economy, wherein the processor determines whether the amount of fuel that will be remaining in the vehicle after the vehicle travels to the next driving destination is less than the amount of a fuel customarily remaining in the vehicle when the vehicle is refueled; and wherein the refueling notification is actuated to a driver of a vehicle in response to the determination that the amount of fuel that will be remaining in the vehicle after the vehicle travels to the next driving destination will be less than the amount of fuel customarily remaining in the vehicle when the vehicle is refueled.

* * * * *